Patented Oct. 20, 1931

1,828,449

UNITED STATES PATENT OFFICE

GEORGE WILBUR SEYMOUR, OF CUMBERLAND, MARYLAND, ASSIGNOR TO CELANESE CORPORATION OF AMERICA, A CORPORATION OF DELAWARE

COMPOSITION CONTAINING A DERIVATIVE OF CELLULOSE

No Drawing.  Application filed October 15, 1929. Serial No. 399,884.

This invention relates to coating or plastic compositions containing a derivative of cellulose, and particularly organic derivative of cellulose, containing a synthetic resin compatible therewith.

An object of my invention is to provide a suitable resin for lacquers or plastic compositions containing derivatives of cellulose, which resin is compatible with the other constituents of the lacquers and which produces clear solutions which upon drying form films that are adherent, tough and hard and water-repellant.

The preparation of a lacquer containing organic derivatives of cellulose such as cellulose acetate as the main constituent of the lacquer base, which lacquer is to be applied to a hard, smooth surface presents many difficulties. This is due primarily to the fact that films from lacquers containing cellulose acetate as the sole constituent of the lacquer base do not adhere to smooth surfaces. When attempts are made to incorporate natural gums or resins in the lacquer containing cellulose acetate in order to impart the necessary adhesive qualities to the film produced from it, both the lacquer and the film produced become cloudy and unhomogeneous.

I have found that synthetic resins produced by the condensation of a formalglycerol with a hydroxy aromatic alcohol in the presence of an alkaline or acid catalyst are compatible with cellulose acetate, and that when added to lacquers containing cellulose acetate they form clear solutions that upon drying produce clear, hard and tough and firmly adherent films.

In accordance with my invention, I prepare a coating or plastic composition which contains one or more derivatives of cellulose, a synthetic resin prepared by the condensation of a formalglycerol and a hydroxy aromatic alcohol and a suitable volatile solvent. The liquid coating composition or the plastic composition may also contain one or more natural or semi-synthetic resins or gums, one or more plastifiers or softening agents, medium and/or high boiling point solvents and preferably though not necessarily, some pigments and/or dyes.

Solutions thus formed may be employed as a lacquer or composition for metal, glass or other surfaces and may be used for making photographic or other films. Artificial yarns may be formed by extruding the solution containing the derivative of cellulose and the special resin through the orifices of a spinneret, either into a heated evaporative atmosphere as in dry spinning, or into a precipitating bath as in wet spinning. The solution may also be employed as an adhesive, and is particularly useful in this connection for making shatterless glass by causing celluloid sheets to adhere to surfaces of sheets of glass between which they are placed.

The plastic composition containing derivatives of cellulose and the special resin may be worked into sheets which may also be used for laminated glass, and also may be worked into blocks or articles in any known manner.

The derivative of cellulose that may be used for making the solutions for coating or plastic compositions comprises any suitable derivative, such as cellulose nitrate or organic derivatives of cellulose. Examples of organic derivatives of cellulose are organic esters of cellulose such as cellulose acetate, cellulose formate, cellulose propionate and cellulose butyrate or cellulose ethers such as ethyl cellulose, methyl cellulose and benzyl cellulose.

The low boiling point solvent that may be employed may be one or a mixture of two or more of the following: acetone, alcohol, benzene or ethylene dichloride. Examples of medium and/or high boiling point solvents are ethyl acetate, ethyl lactate, tetrachlorethane, or diacetone alcohol. Of course it is understood that the choice of the solvents depends on the solubility characteristics of the particular derivative of cellulose employed. Examples of suitable plastifiers are diphenylol propane, triacetin, dibutyl tartrate, diethyl phthalate, mono methyl xylene sulfonamid. If desired, fire retardants may be added, particularly the very effective bromine derivatives of organic compounds, such as brominated tricresyl phosphate. The pigments or dyes that may be used may be those ordinarily employed in the paint or lacquer industry.

Of the natural gums or resins that may be added, the following may be mentioned: manile, accaroides, pontianak, kauri, dammar, rosin and shellac. The semi-synthetic resin, ester gum, which is the glycerol ester of rosin may be also added. If desired, synthetic resins, other than the special formalglycerol-hydroxy aromatic alcohol resin may be employed in conjunction therewith, and examples of these are the fusible and soluble phenol-formaldehyde or diphenylol propane-formaldehyde resins preferably prepared in the presence of acid catalysts.

The special synthetic resin employed in this invention may be prepared by the condensation of equimolecular proportions of a formalglycerol with a hydroxy aromatic alcohol in the presence of an alkaline or acid catalyst. The formalglycerol, having the structural formula

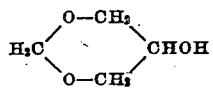

may be prepared in any suitable manner, for instance, by refluxing equimolecular proportions of glycerol or polyglycerol with trihydroxymethylene. Any suitable hydroxy aromatic alcohol may be employed, examples of which are hydroxy benzyl alcohol $(OH.C_6H_4.CH_2OH)$, hydroxy tolyl alcohol $$\left( OH.C_6H_3{<}^{CH_3}_{CH_2OH} \right),$$

hydroxy xylyl alcohol

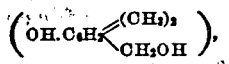

or other substituted hydroxy benzyl alcohols.

As an example of preparing the resin, 3.5 parts by weight of concentrated ammonium hydroxide are added to 100 parts by weight of a mixture of equimolecular proportions of the formalglycerol and the hydroxy aromatic alcohol. The solution is refluxed for 1 to 2 hours at 60 to 70° C. and heated in an open vessel at 100° C. until it sets to a resin.

The following examples serve to illustrate coating or plastic compositions made in accordance with this invention.

*Example I*

A coating composition containing the resin may be made as follows:

| | Parts by weight |
|---|---|
| Cellulose acetate | 10 |
| Synthetic resin | 1 to 20 |
| Acetone | 100 |

*Example II*

The following is another example of coating composition:

| | Parts by weight |
|---|---|
| Cellulose acetate | 10 |
| Synthetic resin | 1 to 20 |
| Acetone | 50 |
| Benzene | 25 |
| Alcohol (ethyl or denatured) | 25 |
| Diacetone alcohol | 20 |

*Example III*

The following is an example of a solution that is suitable as an adhesive, and is particularly useful for causing a sheet of celluloid to adhere to surfaces of sheets of glass, cardboard, asbestos, metal, etc.

| | Parts by weight |
|---|---|
| Cellulose acetate | 20 |
| Synthetic resin | 25 |
| Acetone | 60 |
| Ethyl acetate | 30 |
| Ethyl lactate | 10 |

*Example IV*

Following is an example of a plastic composition:

| | Parts by weight |
|---|---|
| Cellulose acetate | 100 |
| Synthetic resin | 40 |
| Monomethyl xylene sulfonamid | 10 |
| Alcohol | 50 |
| Benzene | 50 |

*Example V*

The following is an example that may be employed for making artificial yarn by extruding through the orifices of a spinneret into a heated, evaporative atmosphere:

| | Parts by weight |
|---|---|
| Cellulose acetate | 100 |
| Synthetic resin | 20 |
| Acetone | 400 |

*Example VI*

The following is a formula for pigmented lacquer:

| | Parts by weight |
|---|---|
| Cellulose acetate | 20 |
| Synthetic resin | 25 |
| Diphenylol propane | 10 |
| Pigment | 10 |
| Acetone | 100 |
| Ethyl acetate | 20 |
| Benzene | 20 |
| Toluene | 10 |
| Ethyl lactate | 20 |

*Example VII*

The following examples are given to illustrate the use of a synthetic resin in connection with cellulose nitrate for various purposes.

(a) Coating composition may contain:

| | |
|---|---|
| Cellulose nitrate | 6 kilograms |
| Camphor | 2 kilograms |
| Diethyl phthalate | 2 kilograms |
| Synthetic resin | 10 kilograms |
| Benzene | 20 litres |
| Alcohol | 20 litres |
| Butyl alcohol | 20 litres |
| Butyl acetate | 20 litres |
| Ethyl acetate | 30 litres |

(b) An adhesive solution suitable for use in the preparation of laminated glass may contain:

| | |
|---|---|
| Cellulose nitrate | 0.4 kilograms |
| Camphor | 0.1 kilograms |
| Dibutyl phthalate | 0.1 kilograms |
| Synthetic resin | 1.0 kilograms |
| Benzene | 20 litres |
| Alcohol | 10 litres |
| Butyl alcohol | 20 litres |
| Butyl acetate | 20 litres |
| Ethyl acetate | 30 litres |

The synthetic resin used in these examples is any of the resins produced by condensing formalglycerol with hydroxy aromatic alcohols, as described above.

In the foregoing examples, the cellulose acetate may be replaced by cellulose propionate, cellulose butyrate, etc. Either the cellulose acetate or the cellulose nitrate may be replaced by cellulose ethers.

It is to be understood that the foregoing detailed description is given merely by way of illustration, and that many variations may be made therein, without departing from the spirit of my invention.

Having described my invention, what I claim and desire to secure by Letters Patent is:

1. A composition of matter containing a derivative of cellulose and a resin formed by the condensation of formalglycerol with a hydroxy aromatic alcohol.

2. A composition of matter containing cellulose acetate and a resin formed by the condensation of formalglycerol with a hydroxy aromatic alcohol.

3. A composition of matter containing cellulose nitrate and a resin formed by the condensation of formalglycerol with a hydroxy aromatic alcohol.

4. A composition of matter containing a cellulose ether and a resin formed by the condensation of formalglycerol with a hydroxy aromatic alcohol.

5. A composition of matter containing a derivative of cellulose and a resin formed by the condensation of formalglycerol with hydroxy benzyl alcohol.

6. A composition of matter containing a derivative of cellulose and a resin formed by the condensation of formalglycerol with hydroxy tolyl alcohol.

7. A composition of matter containing a derivative of cellulose and a resin formed by the condensation of formalglycerol with hydroxy xylyl alcohol.

8. A composition of matter containing cellulose acetate and a resin formed by the condensation of formalglycerol with hydroxy benzyl alcohol.

9. A composition of matter containing cellulose nitrate and a resin formed by the condensation of formalglycerol with hydroxy benzyl alcohol.

10. A liquid coating composition containing a derivative of cellulose, a resin formed by the condensation of formalglycerol and a hydroxy aromatic alcohol, and a volatile solvent therefor.

11. A liquid coating composition containing cellulose acetate, a resin formed by the condensation of formalglycerol and a hydroxy aromatic alcohol, and a volatile solvent therefor.

12. A liquid coating composition containing a derivative of cellulose, a resin formed by the condensation of formalglycerol, a hydroxy benzyl alcohol, and a volatile solvent therefor.

13. A liquid coating composition containing cellulose acetate, a resin formed by the condensation of formalglycerol, a hydroxy benzyl alcohol, and a volatile solvent therefor.

In testimony whereof, I have hereunto subscribed my name.

GEORGE WILBUR SEYMOUR.